Patented Dec. 27, 1949

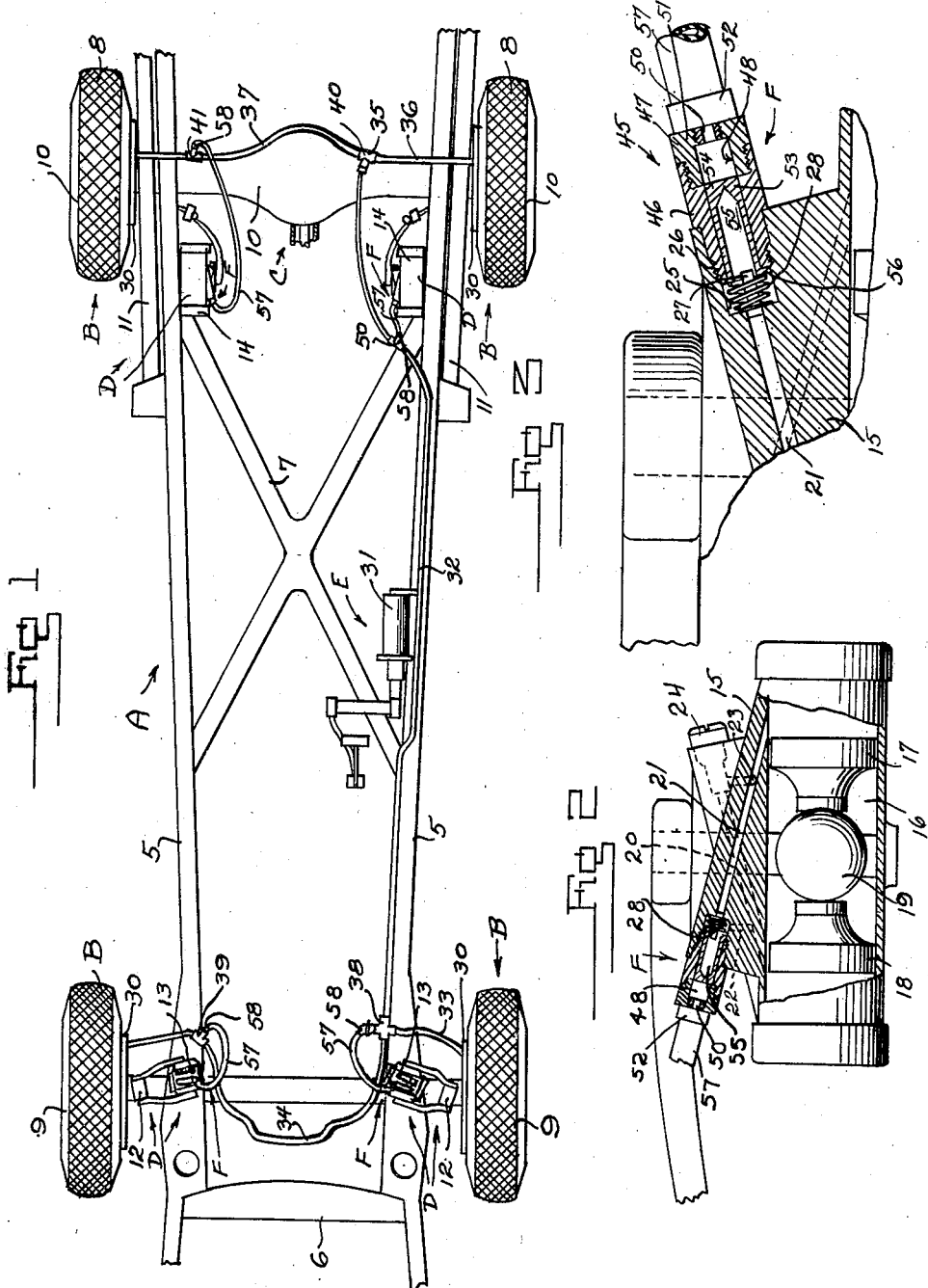

2,492,331

UNITED STATES PATENT OFFICE 2,492,331

SHOCK ABSORBER VALVE REGULATOR

Russell Mason Spring, South Sudbury, Mass.

Application March 27, 1947, Serial No. 737,575

6 Claims. (Cl. 188—2)

This invention relates to vehicle braking systems and more particularly to means to minimize or substantially prevent the dipping and pitching of vehicles, such as motor vehicles, set up upon more or less abrupt application of the brakes therof.

An important object of the invention is to provide, in braking systems, devices in the nature of regulations, interposed in the braking system of a vehicle, such as the hydraulic braking system of a motor vehicle, and actuated by this system for operation upon the compression valves and/or rebound valves of the shock absorber assembly, so as to stiffen the shock absorber action to such a degree that the vehicle remains on a level plane when the brakes are applied, even when applied in an abrupt manner.

Another important object is to provide devices as described which, when properly connected to the rear shock absorber valve, stiffen the action of the latter so that the vehicle will settle slightly in the rear, due to the connection on the rebound side of the shock absorber valve, and retaining the vehicle from rising while the torque of the brake application on the rear axle tends to pull the vehicle downwardly by depressing the forward portions of the rear springs.

Still another important object is to provide devices as described which, when coupled to the front shock absorber valves, on the compression side thereof, retain the vehicle in a level plane when the brakes are applied, thus providing a safety factor of great importance in modern vehicle stopping practices.

Yet another important object is to provide a fully automatic device as described which, upon an easy application of the brakes, will cause but little valve reaction, while an abrupt, hard application causes a greater valve reaction, varying to meet the particular degree of brake application.

Other objects and advantages of the invention will be apparent during the course of the following detailed description of the invention, taken in connection with the accompanying drawing, forming a part of this application and in which drawing:

Figure 1 is top plan of a conventional motor vehicle chassis, showing four of the novel devices installed thereon in conjunction with shock absorbers and interposed in a conventional braking system.

Figure 2 is a vertical section of a conventional shock absorber, particularly portions of its rebound valve structure with one of the new devices connected therewith.

Figure 3 is a sectional view of one of the devices shown on an enlarged scale, connected to the compression valve of the shock absorber.

In the drawing, wherein for the purpose of illustration is shown a preferred embodiment of the invention and wherein similar reference characters designate corresponding parts throughout the several views, the letter A designates a vehicle chassis; B, ground wheels; C, wheel drive means; D, chassis suspension means; E, brake means; and F the novel regulator.

For the purpose of illustration there is shown a conventional vehicle structure including a motor vehicle chassis A, having a pair of spaced-apart side sills 5, connected as by cross members 6 and 7, and the chassis is supported by ground wheels B, comprising rear or drive wheels 8 and front or steering wheels 9. The former are, of course, carried by axle means within an axle housing 10, comprising a part of the conventional wheel drive means C of the vehicle. Between the axle housing 10 and the side sills 5 are two springs 11, forming part of the suspension means D, while between each of the sills 5 and the front wheels 9 is a conventional operative spring connection 12, also forming part of the suspension means D.

Forming another portion of the suspension means D, is a plurality of shock absorbers 13 and 14. In the example shown, there are four conventional shock absorbers, which may be of the general construction shown and described in United States Patent 1,933,151 to Edwin F. Rossman, granted October 31, 1933, and including the passageways and valve structure disclosed in United States Patent 2,184,184 to Carl W. Gerhardt, granted December 19, 1939. The two shock absorbers 13 are mounted upon the forward end portions of the sills 5 and associated with the spring connections 12 as is well known in the art, and the shock absorbers 14 are mounted upon the rearward end portions of the sills 5 and associated with the springs 11 as is also well known in the art. Briefly each shock absorber 13 or 14 includes a housing 15 defining a piston chamber 16 containing a pair of pistons 17 and 18, disposed to either side of an oscillating cam member or rocker 19, and a suitable so-called shock absorber fluid (not shown). Extending through the housing walls are two passageways, comprising a rebound valve fluid passageway 20 opening into the chamber 16 to the rear of the piston 17, and a compression valve fluid passageway 21 opening into the chamber 16 to the rear of the piston 18. Extending to the passageway 20 from the passageway 21 at, preferably, adjacent the connection of the passageway 21 and chamber 16 is an auxiliary passageway or by-pass 22 and extending to the passageway 21 from the passageway 20 at, preferably, adjacent the connection of the passageway 20 and chamber 16 is an auxiliary passageway or by-pass 23.

Each passageway 20 and 21 extends to the exterior of the housing 15 and each is normally closed by a screw plug 24, the passageways 20 and 21 being enlarged in circumference as at 25 and being screw threaded as at 26 to accommodate the screw plugs 24. In fact, the enlarged portions of the passageways extend to the junctures of the auxiliary passageways and main passageways, forming valve chambers, and each contains a valve structure including a valve body-portion 27 normally closing the main passageway 20 or 21 as the case may be (so that fluid cannot flow freely into the auxiliary passageways or by-passes 22 and 23, as the case may be). These valve body portions 27 are urged into seating by expansion coil springs 28 with the outer ends of the spring being retained by the plugs 24. While they, when seated, block nearly all flow of shock absorber fluid, each is provided with a small orifice, such as the orifice 78 illustrated and described as the orifice 78 in U. S. Patent 2,184,184 referred to above whereby very small volumes of fluid may pass through the valve body portions 27 when the valves are seated.

Briefly, the operations of the compression valve and rebound valve are as follows: On very slight or slow axle movements, a volume of the shock absorbing fluid flows from the compression end of the chamber 16, through only the orifice, illustrated and described as the orifice 78 in U. S. Patent 2,184,184, in the compression valve body portion 27 and into the rebound end of the chamber 16. Upon rapid movements, the pressure lifts the valve body portion 27 from its seat by compressing the spring 28 and the fluid flows freely through the passageway 23 to the rebound end of the chamber 16. At the same time, the intake valve opens against its spring's pressure, allowing shock absorber fluid to flow into the rebound end of the chamber 18, as is obvious, thus compensating for any depletion of fluid in either end of the chamber. During the rebound, for slow action, the fluid flows through only the orifice, illustrated and described as the orifice 78 in U. S. Patent 2,184,184, of the rebound valve body portion into the compression end of the chamber, but during rapid action, the rebound valve body portion is lifted from its seat against the pressure of its spring 28, and the shock absorber fluid passes at a pressure controlled, of course, by the relief valve, into the compression end of the chamber. At the same time, the intake valve opens against the pressure of its spring 28, allowing fluid to flow freely into the compression end of the chamber for compensating purposes.

Supported by the chassis A is a suitable brake system E, such as a conventional hydraulic brake system; including wheel braking means 30 associated with each wheel 8 and 9. To each means 30 extends a conduit being a portion of a conduit system extending from a master cylinder 31. The conduit system includes a conduit 32 extending along one sill 5 forwardly and rearwardly. Forwardly, it is coupled with a T-coupling (not shown) with a brake conduit 33 to one forward wheel braking means 30. From the T-coupling extends a second branch conduit 34 to the other forward wheel braking means 30. Rearwardly, the conduit 32 is joined by a T-coupling 35 to two branch conduits 36 and 37 leading to the two rearward wheel braking means. In order to couple the novel regulators F with the brake system E, an X-coupling 38 is substituted for the first T-coupling mentioned, a T-coupling 39 interposed in the conduit 34, and T-couplings 40 and 41, in the conduits 32 and 37 adjacent the rear end of the chassis. The connections with these couplings 38 to 41 inclusive will be subsequently explained, since they are connected with portions of the novel regulators F next described.

Each regulator F includes a housing 45 which may be a tubular section 46 closed at one end by a cap section 47, defining a plunger-accommodating chamber 48, all shown best in Figure 3. The inner end portion of the section 46 is exteriorly screw threaded so that the housing 45 may be screwed into the screw threaded exterior mouth of any passageway 20 or 21, after removal of the screw plug 24. It will be noted that the innermost end or face of the section 46 provides an abutment for a purpose later detailed. At its outer end portion, the section 46 is interiorly screw threaded so that the cap section 47, which is provided with a flange or skirt having complementary screw threads, may be screwed thereto. The cap section 47 has a perforation 50 at, preferably, the axial center of its outermost wall 51 (from which wall the flange or skirt extends). This perforation may be screw threaded to receive the screw threaded end of a conduit connection 52.

Slidable within the chamber 48 is a plunger 53 which may be tubular, with a closed outer end 54 and providing a valve body portion-accommodating recess 55 for a part of any of the valve body portions 27. That is, the length of the plunger 53 and its recess 55 taken with the length of the chamber 48 is such that as the plunger 53 reciprocates, as will be described, the part of the valve body portion outwardly of the convolutions of the spring 28 will be accommodated therein at all times. At its innermost or open end, the plunger 53 is provided with an outwardly extending flange 56 constructed and arranged so that one of its faces will normally contact the abutment referred to at the inner end of the section 46 while its opposite face will contact the outer end of the spring 28. When the flange 56 contacts this abutment the closed outer end 54 of the plunger will be spaced from the outermost wall 51 of the cap portion, so that a subchamber will be provided, defined by the walls 51, outer end 54 of the plunger and surrounding parts of the wall of the tubular section 46. Obviously, as the plunger 53 moves to compress the spring 28, this sub-chamber will increase in size.

Each conduit connection 52 is coupled to a suitable section of conduit 57 with a suitable nipple or connection 58 at its outer end so that it may be coupled to any of the couplings 38 to 41 described.

The novel regulators F are arranged with a separate regulator associated with the compression valve of each front shock absorbed 13, and a separate regulator associated with the rebound valve of each rear shock absorber 14, after the screw plugs 24 of the conventional compression valves of the front shock absorbers, as well as these plugs 24 of the rebound valves of the rear shock absorbers, have been removed. The springs 28 and valve body portions 27 not being disturbed.

With the regulators F, coupled as stated, the brake fluid will flow through the conduits 57 and enter those portions of the chambers 48 in back of the plungers 53 and exert pressure thereon and, consequently, supplements the springs 28. This pressure, at the time of brake application, stiffens shock resistance to reduce or stop dipping of the front end of the chassis and raising of the rear end thereof but, at no time, preventing the shock absorbers to function properly in the event a wheel or the wheels of the vehicle encounter an obstruction. Obviously a light application of the brakes causes a light pressure against the plungers 53 associated with the compression valves of the front shock absorbers and the rebound valves of the rear shock absorbers, and increase of brake application causes a corresponding increase in pressure against these plungers.

Various changes may be made to the form of the invention herein shown and described without departing from the spirit of the invention or scope of the claims.

What is claimed is:

1. In combination with the fluid braking system of a wheeled vehicle, including a braking fluid-containing conduit, and the chassis suspension means of said vehicle, including a shock absorber having a housing defining a shock absorber fluid-containing chamber, a pair of pistons therein, fluid passageways from each end of the chamber to the exterior of said housing, fluid bypasses from one passageway to the other connected with adjacent the outer end of one passageway and adjacent the inner end of the other passageway, a valve within each passageway at the intersection of the passageway and its bypass, and resilient means for each valve, urging the valve to seat, including an expansion coil spring; a regulator for one of said valves, including a regulator housing defining a regulator chamber having an open end, means coupling said regulator housing to said shock absorber housing at one of said passageways, with said open end facing one of said springs, a plunger slidable within the regulator chamber and contacting one end of said spring, and a regulator conduit leading from the regulator chamber, at a location back of said plunger, to the interior of said brake fluid conduit.

2. In combination with the fluid braking system of a wheeled vehicle, including a braking fluid-containing conduit, and the chassis suspension means of said vehicle, including a shock absorber having a housing defining a shock absorber fluid-containing chamber, a pair of pistons therein, fluid passageways from each end of the chamber to the exterior of said housing, fluid bypasses from one passageway to the other, connected with adjacent the outer end of one passageway and adjacent the inner end of the other passageway, a valve within each passageway at the intersection of the passageway and its bypass, and resilient means for each valve, urging the valve to seat, including an expansion coil spring; a regulator for one of said valves, including a regulator housing defining a regulator chamber having an open end, means coupling said regulator housing to said shock absorber housing at one of said passageways, with said open end facing one of said springs, a plunger slidable within the regulator chamber and contacting one end of said spring, a regulator conduit leading from the regulator chamber, at a location back of said plunger, to the interior of said brake fluid conduit, and means limiting movement of said plunger toward the opening of said regulator conduit into said regulator chamber.

3. In combination with the fluid braking system of a wheeled vehicle, including a braking fluid-containing conduit, and the chassis suspension means of said vehicle, including a shock absorber having a housing defining a shock absorber fluid-containing chamber, a pair of pistons therein, fluid passageways from each end of the chamber to the exterior of said housing, fluid bypasses from one passageway to the other, connected with adjacent the outer end of one passageway and adjacent the inner end of the other passageway, a valve within each passageway at the intersection of the passageway and its bypass, and resilient means for each valve, urging the valve to seat, including an expansion coil spring; a regulator for one of said valves, including a regulator housing defining a regulator chamber having an open end, means coupling said regulator housing to said shock absorber housing at one of said passageways, with said open end facing one of said springs, a plunger slidable within the regulator chamber and contacting one end of said spring, a regulator conductor leading from the regulator chamber, at a location back of said plunger, to the interior of said brake fluid conduit, and means limiting movement of said plunger toward the opening of said regulator conduit into said regulator chamber, including an abutment at the inner end of said regulator housing and a flange extending outwardly from the inner end of said plunger and normally disposed upon said abutment.

4. In combination with the fluid braking system of a wheeled vehicle, including a braking fluid conduit, and with a fluid-contained shock absorber having a rebound valve, and elongated coil spring normally urging said valve to seat, a compression valve and an elongated coiled spring normally urging said compression valve to seat, a regulator for said shock absorber, including an elongated regulator housing provided with an elongated chamber having an open end, means coupling said regulator housing to the shock absorber with the longitudinal axis of said regulator housing and the longitudinal axis of the coiled spring of one of said valves in substantial alignment and said end opening to one end of said coiled spring, a plunger slidable longitudinally of said regulator chamber and bearing against said one end of said coiled spring, and a regulator conduit leading from the regulating chamber, at a location back of said plunger, to the interior of said braking fluid conduit.

5. In combination with the fluid braking system of a wheeled vehicle, including a braking fluid conduit, and with a fluid-contained shock absorber having a rebound valve, an elongated coiled spring normally urging said valve to seat, a compression valve and an elongated coiled spring normally urging said compression valve to seat, a regulator for said shock absorber, including an elongated regulator housing provided with an elongated chamber having an open end, means coupling said regulator housing to the shock absorber with the longitudinal axis of said regulator housing and the longitudinal axis of the coiled spring of one of said valves in substantial alignment and said open end opening to one end of said coiled spring, a plunger slidable longitudinally of said regulator chamber and bearing against said one end of said coiled spring, and a regulator conduit having an opening into the regulator chamber, at a location back of said plunger, and said regulator conduit extending to said brake fluid conduit and opening thereinto, and means limiting movement of said plunger toward the opening of said regulator conduit into said regulator chamber.

6. In combination with the fluid braking system of a wheeled vehicle, including a braking fluid conduit, and with a fluid-contained shock absorber having a rebound valve, an elongated coiled spring normally urging said valve to seat, a compression valve and an elongated coiled spring normally urging said compression valve to seat, a regulator for said shock absorber, including an elongated regulator housing provided with an elongated chamber having an open end, means coupling said regulator housing to the shock absorber with the longitudinal axis of said regulator housing and the longitudinal axis of the coiled spring of one of said valves in substantial alignment, and said end opening to one end of said coiled spring, a plunger slidable longitudinally of said regulator chamber and bearing against said one end of said coiled spring, and a regulator conduit having an opening into the regulator chamber, at a location back of said plunger, and said regulator conduit extending to said braking fluid conduit and opening thereinto, and means limiting movement of said plunger toward the opening of said regulator conduit into said regulator chamber, including an abutment at the inner end of said regulator housing and a flange secured to and extending outwardly from the inner end of said plunger and normally disposed upon said abutment.

RUSSELL MASON SPRING.

REFERENCES CITED

The following references are of record in the file of this patent:

UNITED STATES PATENTS

| Number | Name | Date |
|---|---|---|
| 1,957,115 | Thompson et al. | May 1, 1934 |
| 2,127,294 | Griswold | Aug. 16, 1938 |
| 2,131,014 | Sanford | Sept. 20, 1938 |
| 2,380,309 | Hicks | July 10, 1945 |